S. HEATH.
PROPELLER HUB BORING AND FACING MACHINE.
APPLICATION FILED OCT. 20, 1917.
1,283,755.
Patented Nov. 5, 1918.
2 SHEETS—SHEET 1.
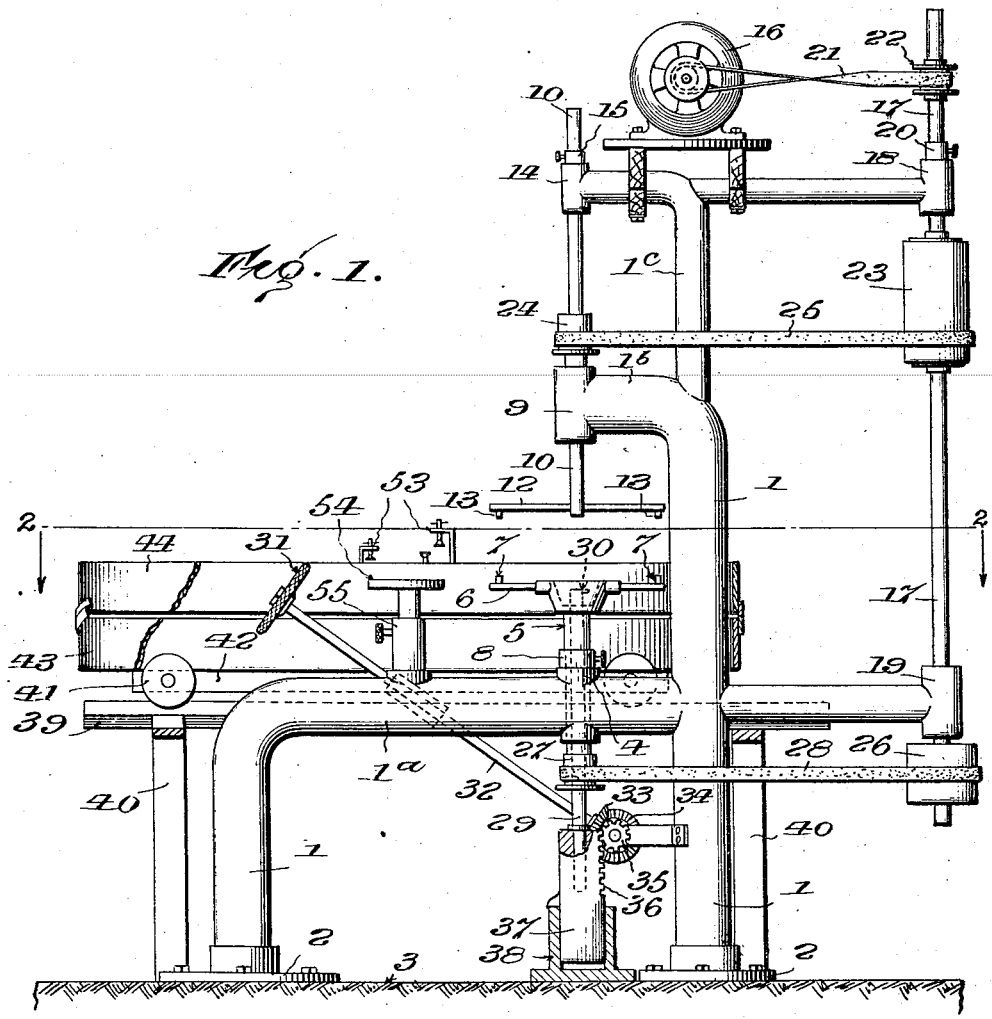

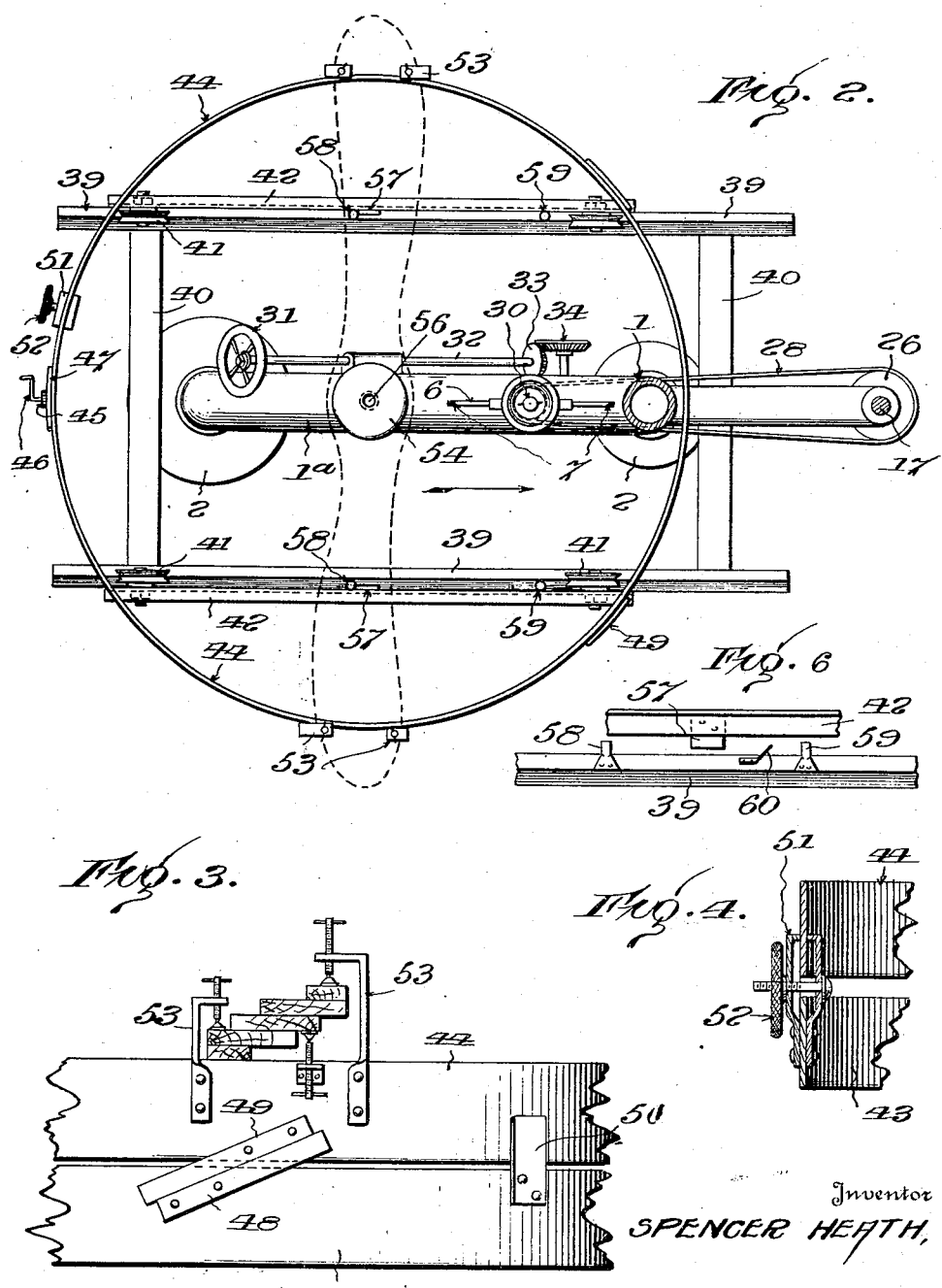

UNITED STATES PATENT OFFICE.

SPENCER HEATH, OF BALTIMORE, MARYLAND.

PROPELLER-HUB BORING AND FACING MACHINE.

1,283,755.  Specification of Letters Patent.  Patented Nov. 5, 1918.

Application filed October 20, 1917. Serial No. 197,606.

*To all whom it may concern:*

Be it known that I, SPENCER HEATH, a citizen of the United States, residing at Baltimore and State of Maryland, have invented new and useful Improvements in Propeller - Hub Boring and Facing Machines, of which the following is a specification.

This invention relates to improvements in boring and facing machines and pertains particularly to machines for correctly boring a hole through the axial center of a flying machine propeller hub and cutting the parallel opposite hub faces.

The invention provides means for correctly centering the work on a traveling carriage and moving said carriage into position for the cutting and boring operations.

The invention further provides for rigidly mounting the work on the carriage and provides means for varying the elevation of the work and work support without disturbing the rigidity or centered position of the work.

The invention further provides a unitary hub boring construction acting through the hollow shaft of one of the hub facing cutters.

Other details of the invention are described and claimed in the following specification and claims and are illustrated in the accompanying drawings in which:

Figure 1 represents a side elevation of the machine showing the work carriage broken away.

Fig. 2 represents a sectional view along line 2—2 of Fig. 1 showing a top plan view of the work carriage and track.

Fig. 3 is an enlarged view of a portion of the work carriage showing the work clamps and the oblique supporting surfaces.

Fig. 4 is an enlarged view of the clamp for holding the upper part of the work carriage on the lower part.

Fig. 5 is an enlarged view of the gear and rack bar used to elevate the work frame.

Fig. 6 is a fragmentary view of the track and work carriage showing the limit stop lugs.

Referring in detail to the construction shown in the drawings, 1 is a main support member provided with suitable base flanges 2 which are mounted on a suitable foundation 3. A horizontal support member $1^a$ is connected to the main supports 1 and has a bearing member 4 through which there projects upwardly a shaft 5 carrying the rotary cutter member 6 having blades 7. A collar 8 is provided surrounding the shaft 5 and adapted to maintain the cutter member at the correct elevation. At the upper portion of the support member 1 is an extension $1^b$ having a bearing member 9 through which there projects a drive shaft 10 carrying a rotary cutter member 12 having the blades 13. These upper and lower cutters are shown as what are known as disk cutters which cut parallel to the face of the disk and are preferably used instead of cylindrical cutters, although applicant does not desire to be limited to this particular form of cutter. An extension $1^c$ projects upwardly from the main support member 1 and provides an upper bearing 14 for the reception of the upper end of the shaft 10. A collar 15 is provided for maintaining the correct vertical adjustment of the shaft 10.

Drive means for the rotation of the cutter members 12 is provided by a motor 16 mounted above the support extension $1^c$. At the extreme right of the structure a vertical shaft 17 is mounted in an upper bearing 18 and a lower bearing 19. A collar 20 is provided for maintaining the correct position of the shaft within the bearings. Power from the motor 16 is transmitted through a drive belt 21 to a pulley 22 on the shaft 17. Power from the shaft 17 is provided for the upper cutter member 12 through the pulley wheel 23 which drives a pulley 24 located on the shaft 10 by means of a belt 25. Power from the shaft 17 to the lower cutter member 6 is provided by a pulley 26 driving a pulley 27 located on the shaft 5, power being transmitted by a belt 28.

Means for boring the hub of the work or propeller is provided by means of a shaft 29 which extends upwardly through the shaft 5 and is keyed to turn therewith but has a sliding engagement so that the shaft 29 may be elevated or lowered according to the time when the hub boring action is to take place. The upper end of the shaft 29 may be provided with a cutter knife 30 of any desirable contour or size. Means for elevating the shaft 29 to place the knife 30 in the operable position is provided by a hand wheel 31 mounted on a shaft 32. At the lower end of this shaft there is provided a bevel gear 33 in engagement with a corresponding bevel gear 34. This latter gear is mounted on the same shaft with, and is axially connected rigidly to, a spur gear 35 which is in mesh with a rack bar 36 engaging the lower end of the shaft 29. The lower end of the rack bar 36 provides a shaft portion 37 which is journaled in a socket or bearing 38 and provides a support member for the lower end of the shaft 29.

Located on either side of the supporting frame 1 are the track members 39 which are mounted on suitable vertical supports 40. Movably mounted on the track members 39 is a work carriage having the wheels 41, frame 42 and lower stationary circular frame 43 rigidly mounted on the frame 42. The tracks 39 are preferably provided with an angular upper surface and the wheels 41 are designed to have a central groove adapted to fit onto the angle of the rails or tracks, this being in accordance with the customary construction of the mounting of work carriages on supporting frames. The lower stationary circular frame 43 is adapted to encircle the supporting frame 1 and the rotary cutter members. Mounted on the circular frame 43 is a corresponding movable frame 44 of substantially the same size and shape. Means for elevating the frame 44 on the frame 43 is provided by a gear member 45 mounted on the frame 43 and provided with an actuating handle 46. This gear is adapted to engage the gear teeth of a rack bar 47 connected to the upper movable frame 44 and fixed in an oblique position. When the gear 45 is operated the frame 44 is moved concentrically with the lower frame 43 and elevated at the same time. The weight of the upper movable frame 44 is supported on the oblique guides 48 mounted on the frame 43 and corresponding guides 49 mounted on the upper frame 44, the guides 48 and 49 having an oblique position and being slidable one upon the other. At convenient locations around the lower frame 43 there are provided a sufficient number of vertical standards 50 rigidly connected to the frame 43 and extending upwardly to hold the upper frame 44 concentric to the lower frame 43. A locking member for clamping the upper and lower frames in any desired position is indicated at 51 and comprises a hand wheel 52 or other suitable clamping means for actuating a jaw member securely holding both the upper and lower frames to prevent movement of either one relative to the other.

The work or propeller form which is to be operated upon is adapted to be held in the clamp members 53 mounted on opposite sides of the upper frame member 44. These clamp members are provided in sufficient number and at convenient locations to hold the particular kind of propeller and number of blades. When a propeller is to be used as the work the material is laid diametrically across the upper frame 44 and clamped by means of the clamping members 53. In order to center the work correctly there is provided a centrally located adjustable table member 54 which is movably mounted in the vertical bearing 55 connected to the supporting member 1ª. The position of the table 54 is predetermined according to the position of the cutter member 6 and the knives 7, it being necessary that the hub of the propeller be fixed at a certain elevation with respect to the cutter member before being moved into engagement with the cutter member. The table 54 has the function of a test member or gage for the setting of the elevation of the work and the corresponding elevation of the upper movable frame 44 carrying the work. It is necessary that the cutter members and the table be absolutely fixed with respect to the distance between the tracks 39, and in the preferred form it is preferable that the table be so situated that it may be exactly at the center of the circular supporting frames 43 and 44 when the work is mounted and the elevation of the same adjusted to the height of the table 54. The center of the table 54 is illustrated as having a vertical opening 56 which is used in centering the work on the table, a pin being inserted through the work and lowered into the opening. A different construction, not shown, may be provided by the use of a rod to project upwardly through the opening 56 to engage the axial opening in the hub of the work. In order that the center of the work carriage shall be over the center of the table 54, when the carriage is at the extreme left, as shown in the drawings, the following limit stops are provided. Downwardly projecting extensions 57 are rigidly secured to the side frames 42 at the center thereof. These extensions 57 are adapted to engage the projecting lugs 58 mounted on the tracks 39, as indicated in Figs. 1 and 2, positioning the center of the work immediately over the center of the table 54. A corresponding set of lugs 59 is provided on the tracks 39 to limit the movement of the carriage toward the right. The lugs 59 should be substantially in alinement with the shaft 29, so as to stop the carriage with the center of the work immediately over the hub boring tool 30 and shaft 29. A suitable spring latch 60 may be provided to lock the carriage in position when the propeller hub is in the hub boring position in axial alinement with the shaft 29.

The operation of the machine will be understood from the foregoing description of construction and the following explanation. The work is mounted on the frame as hereinbefore described and the elevation of the work predetermined and adjusted according to the position of the test table 54. The work carriage is then moved to the right as shown in the drawings until the work is carried so that the axial center of the hub will be directly in alinement with the shaft 29 and its cutter member. As the work is moved in between the cutter members 6 and 12 the knives carried by these members are rapidly rotating in horizontal planes and remove such portions of the opposite faces of the hub of the propeller according to the position and elevation of the cutter members. By the time that the work has been brought into alinement with the shaft 29 and there firmly secured against the limit stop lugs the cutting action of the opposite faces of the hub will be substantially complete. At this time the hand wheel 31 is actuated to elevate the shaft 29 and its cutters 30. By this means the exact center of the propeller hub is bored to the correct size of opening.

From the foregoing it will be clear that the present invention provides a machine for cutting the opposite faces of a propeller hub absolutely parallel and at the same time boring the propeller hub opening at right angles to the faces of the propeller. In addition to these advantages the machine provides an unusually simple and effective method and apparatus for centering the work and gaging the elevation of the work with respect to the cutter members.

Changes in material, size and respective shape of the parts may be made without departing from the scope of the invention.

What I claim is:—

1. In a machine of the character described, an upper rotary cutter, a lower rotary cutter, a runway positioned immediately below said cutters, a traveling work carriage mounted on said runway and adapted to be moved to a position immediately in alinement with the axis of said cutters, and fastening means on said carriage for rigidly holding work, said carriage being adapted to move the work to a position between said cutters and said cutters being adapted to cut the opposite faces of the work, while said carriage is moved into alinement with said cutters.

2. In a machine of the character described, an upper rotary cutter, a lower rotary cutter, a runway, a traveling work carriage mounted on said runway, fastening means on said carriage for rigidly holding work, and means carried by said carriage for raising and lowering the position of the fastening means in a vertical plane without adjusting the fastening means, said carriage being adapted to move the work to a position between said cutters and said cutters being adapted to cut the opposite faces of the work.

3. In a machine of the character described, an upper rotary cutter, a lower rotary cutter, a runway, a traveling work carriage mounted on said runway, fastening means on said carriage for rigidly holding work, means carried by said carriage for raising and lowering the position of said fastening means in a vertical plane without adjusting said fastening means, and a stationary elevation test member constituting a gage for fixing the elevation of work with respect to said cutters, said carriage being adapted to move the work to a position between said cutters and said cutters being adapted to cut the opposite faces of the work.

4. In a machine of the character described, an upper rotary cutter, a lower rotary cutter, a runway, a traveling work carriage mounted on said runway, means on said carriage for rigidly holding work, means carried by said carriage for raising and lowering the position of said fastening means in a vertical plane without adjusting said fastening means, and a stationary elevation and centering test member constituting a combined gage for fixing the elevation and lateral position of the work with respect to said cutters, said carriage being adapted to move work to a position between said cutters and said cutters being adapted to cut the opposite faces of the work.

5. In a machine of the character described, an upper rotary cutter, a lower rotary cutter, the axis of one of said cutters being hollow, an extensible boring cutter within said hollow axis, means to move said extensible boring cutter axially to project beyond the cutter carried by its respective axis, a runway positioned immediately below said cutters, a traveling work carriage mounted on said runway and adapted to be moved to a position immediately in alinement with said cutters and fastening means on said carriage for rigidly holding work, said carriage being adapted to move work to a position between said cutters and said cutters being adapted to cut the opposite faces of the work while said carriage is being moved into alinement with said cutters.

6. In a machine of the character described, an upper rotary cutter, a lower rotary cutter, the axis of one of said cutters being hollow, an extensible boring cutter within said hollow axis, means to move said extensible boring cutter axially to project beyond the cutter carried by its respective axis, a runway positioned immediately below said cutters, a traveling work carriage mounted on said runway and adapted to be moved to a position immediately in alinement with said cutters, fastening means on said carriage for rigidly holding work, and means carried by said carriage for raising and lowering the position of the fastening means in a vertical plane without adjusting the fastening means, said carriage being adapted to move work to a position between said cutters and said cutters being adapted to cut the opposite faces of the work.

7. In a machine of the character described, an upper rotary cutter, a lower rotary cutter, the axis of one of said cutters being hollow, an extensible boring cutter within said hollow axis, means to move said extensible boring cutter axially to project beyond the cutter carried by its respective axis, a runway, positioned immediately below said cutters, a traveling work carriage mounted on said runway and adapted to be moved to a position immediately in alinement with said cutters, fastening means on said carriage for rigidly holding work, means carried by said carriage for raising and lowering the position of said fastening means in a vertical plane without adjusting said fastening means, and a stationary elevation test member constituting a gage for fixing the elevation of work with respect to said cutters, said carriage being adapted to move work to a position between said cutters and said cutters being adapted to cut the opposite faces of the work.

8. In a machine of the character described, an upper rotary cutter, a lower rotary cutter, the axis of one of said cutters being hollow, an extensible boring cutter within said hollow axis, means to move said extensible boring cutter axially to project beyond the cutter carried by its respective axis, a runway, a traveling work carriage mounted on said runway, fastening means on said carriage for rigidly holding work, means carried by said carriage for raising and lowering the position of said fastening means in a vertical plane without adjusting said fastening means, and a stationary elevation and centering test member constituting a combined gage for fixing the elevation and lateral position of the work with respect to said cutters, said carriage being adapted to move work to a position between said cutters and said cutters being adapted to cut the opposite faces of the work.

9. In a machine of the character described, an upper rotary cutter, a lower rotary cutter, a stationary track positioned immediately below said cutters, a traveling work carriage mounted on said track and adapted to be moved to a position immediately in alinement with the axis of said cutters, a work support frame on said carriage, and work holding means on said frame spaced farther apart than the sweep of said rotary cutters, said carriage being adapted to move work to a position between said cutters and said cutters being adapted to cut the opposite faces of the work.

10. In a machine of the character described, an upper rotary cutter, a lower rotary cutter, a stationary track, a traveling work carriage mounted on said track, a work support frame on said carriage, and work holding means on said frame spaced farther apart than the sweep of said rotary cutters, and means carried by said carriage for raising and lowering the position of said work holding means in a vertical plane without adjusting said work holding means, said carriage being adapted to move work to a position between said cutters and said cutters being adapted to cut the opposite faces of the work.

11. In a machine of the character described, an upper rotary cutter, a lower rotary cutter, a stationary track, a traveling work carriage mounted on said track, a work support frame on said carriage, and work holding means on said frame spaced farther apart than the sweep of said rotary cutters, means carried by said carriage for raising and lowering the position of said work holding means in a vertical plane without adjusting said work holding means, and a stationary elevation test member constituting a gage for fixing the elevation of work with respect to said cutters, said carriage being adapted to move work to a position between said cutters and said cutters being adapted to cut the opposite faces of the work.

12. In a machine of the character described, an upper rotary cutter, a lower rotary cutter, a stationary track, a traveling work carriage mounted on said track, a work support frame on said carriage, and work holding means spaced farther apart than the sweep of said rotary cutters, means carried by said carriage for raising and lowering the position of said work holding means in a vertical plane without adjusting said work holding means, and a stationary elevation and centering test member constituting a combined gage for fixing the elevation and lateral position of the work with respect to said cutters, said carriage being adapted to move work to a position between said cutters and said cutters being adapted to cut the opposite faces of the work.

13. In a machine of the character described, an upper rotary cutter, a lower rotary cutter, the axis of one of said cutters being hollow, an extensible boring cutter within said hollow axis, means to move said extensible boring cutter axially to project beyond the cutter carried by its respective axis, a stationary track positioned immediately below said cutters, a traveling work carriage mounted on said track and adapted to be moved to a position immediately in alinement with the axis of said cutters, a work support frame on said carriage, and work holding means spaced farther apart than the sweep of said rotary cutter, said carriage being adapted to move work to a position between said cutters and said cutters being adapted to cut the opposite faces of the work while said carriage is being moved into alinement with said cutters.

14. In a machine of the character described, an upper rotary cutter, a lower rotary cutter, the axis of one of said cutters being hollow, an extensible boring cutter within said hollow axis, means to move said extensible boring cutter axially to project beyond the cutter carried by its respective axis, a stationary track positioned immediately below said cutters, a traveling work carriage mounted on said track and adapted to be moved to a position immediately in alinement with the axis of said cutters, a work support frame on said carriage, and work holding means spaced farther apart than the sweep of said rotary cutters, and means carried by said carriage for raising and lowering the position of the fastening means in a vertical plane without adjusting the fastening means, said carriage being adapted to move work to a position between said cutters and said cutters being adapted to cut the opposite faces of the work.

15. In a machine of the character described, an upper rotary cutter, a lower rotary cutter, the axis of one of said cutters being hollow, an extensible boring cutter within said hollow axis, means to move said extensible boring cutter axially to project beyond the cutter carried by its respective axis, a stationary track positioned immediately below said cutters, a traveling work carriage mounted on said track and adapted to be moved to a position immediately in alinement with the axis of said cutters, a work support frame on said carriage, and work holding means spaced farther apart than the sweep of said rotary cutter, means carried by said carriage for raising and lowering the position of said fastening means in a vertical plane without adjusting said fastening means, and a stationary elevation test member constituting a gage for fixing the elevation of work with respect to said cutters, said carriage being adapted to move work to a position between said cutters and said cutters being adapted to cut the opposite faces of the work.

16. In a machine of the character described, an upper rotary cutter, a lower rotary cutter, the axis of one of said cutters being hollow, an extensible boring cutter within said hollow axis, means to move said extensible boring cutter axially to project beyond the cutter carried by its respective axis, a stationary track, a traveling work carriage mounted on said track, a work support frame on said carriage, and work holding means spaced farther apart than the sweep of said rotary cutter, means carried by said carriage for raising and lowering the position of said fastening means in a vertical plane without adjusting said fastening means, and a stationary elevation and centering test member constituting a combined gage for fixing the elevation and lateral position of the work with respect to said cutters, said carriage being adapted to move work to a position between said cutters and said cutters being adapted to cut the opposite faces of the work.

17. In a machine of the character described, an upper rotary cutter, a lower lower rotary cutter, a stationary track, a traveling work carriage mounted on said track comprising a lower circular part mounted on said track, and an upper part mounted on and concentric with said lower part, fastening means on opposite sides of said upper part for rigidly holding work, means for elevating said upper part with respect to said lower part, said carriage being adapted to move work to a position between said cutters and said cutters being adapted to cut the opposite faces of the work.

18. In a machine of the character described, an upper rotary cutter, a lower rotary cutter, a stationary track, a traveling work carriage mounted on said track comprising a lower circular part mounted on said track, and an upper part mounted on and concentric with said lower part, fastening means on opposite sides of said upper part for rigidly holding work, means for elevating said upper part with respect to said lower part, and a stationary elevation test member constituting a gage for fixing the elevation of the work with respect to said cutters, said carriage being adapted to move work to a position between said cutters and said cutters being adapted to cut the opposite faces of the work.

19. In a machine of the character described, an upper rotary cutter, a lower rotary cutter, a stationary track, a traveling work carriage mounted on said track comprising a lower circular part mounted on said track, and an upper part mounted on and concentric with said lower part, fastening means on opposite sides of said upper part for rigidly holding work, means for elevating said upper part with respect to said lower part, and a stationary elevation and centering test member constituting a combined gage for fixing the elevation and lateral position of the work with respect to said cutters, said carriage being adapted to move work to a position between said cutters and said cutters being adapted to cut the opposite faces of the work.

20. In a machine of the character described, an upper rotary cutter, a lower rotary cutter, the axis of one of said cutters being hollow, an extensible boring cutter within said hollow axis, means to move said extensible boring cutter axially to project beyond the cutter carried by its respective axis, a stationary track, a traveling work carriage mounted on said track comprising a lower circular part mounted on said track, and an upper part mounted on and concentric with said lower part, fastening means on opposite sides of said upper part for rigidly holding work, and means for elevating said upper part with respect to said lower part, said carriage being adapted to move work to a position between said cutters and said cutters being adapted to cut the opposite faces of the work.

21. In a machine of the character described, an upper rotary cutter, a lower rotary cutter, the axis of one of said cutters being hollow, an extensible boring cutter within said hollow axis, means to move said extensible boring cutter axially to project beyond the cutter carried by its respective axis, a stationary track, a traveling work carriage mounted on said track comprising a lower circular part mounted on said track, and an upper part mounted on and concentric with said lower part, fastening means on opposite sides of said upper part for rigidly holding work, means for elevating said upper part with respect to said lower part, and a stationary elevation test member constituting a gage for fixing the elevation of work with respect to said cutters, said carriage being adapted to move work to a position between said cutters and said cutters being adapted to cut the opposite faces of the work.

22. In a machine of the character described, an upper rotary cutter, a lower rotary cutter, the axis of one of said cutters being hollow, an extensible boring cutter within said hollow axis, means to move said extensible boring cutter axially to project beyond the cutter carried by its respective axis, a stationary track, a traveling work carriage mounted on said track comprising a lower circular part mounted on said track, and an upper part mounted on and concentric with said lower part, fastening means on opposite sides of said upper part for rigidly holding work, means for elevating said upper part with respect to said lower part, and a stationary elevation and centering test member constituting a combined gage for fixing the elevation and lateral position of the work with respect to said cutters, said carriage being adapted to move work to a position between said cutters and said cutters being adapted to cut the opposite faces of the work.

23. In a machine of the character described, an upper rotary disk cutter, a lower rotary disk cutter, a runway positioned immediately below said cutters, a traveling work carriage mounted on said runway and adapted to be moved to a position immediately in alinement with the axis of said cutters, fastening means on said carriage for rigidly holding work, and a stationary centering test member constituting a gage for fixing the lateral position of the work with respect to said cutters, said carriage being adapted to move the work to a position between said cutters and said cutters being adapted to cut the opposite faces of the work while said carriage is moved into alinement with said cutters.

24. In a machine of the character described, an upper rotary disk cutter, a lower rotary disk cutter, the axis of one of said cutters being hollow, an extensible boring cutter within said hollow axis, means to move said extensible boring cutter axially to project beyond the cutter carried by its respective axis, a runway positioned immediately below said cutters, a traveling work carriage mounted on said runway and adapted to be moved to a position immediately in alinement with said cutters, fastening means on said carriage for rigidly holding work, and a stationary centering test member constituting a gage for fixing the lateral position of the work with respect to said cutters, said carriage being adapted to move work to a position between said cutters and said cutters being adapted to cut the opposite faces of the work while said carriage is being moved into alinement with said cutters.

25. In a machine of the character described, a rotary disk cutter, a runway positioned parallel to plane of the sweep of said cutter, a traveling work carriage mounted on said runway and adapted to be moved into close proximity to said cutter, fastening means on said carriage for rigidly holding work, and a stationary centering test member constituting a gage for fixing the lateral position of the work with respect to said carriage and said cutter, said carriage being adapted to move the work into engagement with said cutter and said cutter being adapted to cut a face of the work while said carriage is moved into engagement with said cutter.

26. In a machine of the character described, a rotary cutter, a runway, a traveling work carriage mounted on said runway, fastening means on said carriage for rigidly holding work, and means carried by said carriage for raising and lowering the position of the fastening means with respect to said cutter without adjusting the fastening means, said carriage being adapted to move the work into engagement with said cutter and said cutter being adapted to cut a face of the work while said carriage is moved into engagement with said cutter.

27. In a machine of the character described, a rotary face cutter having a hollow axis, an extensible boring cutter within said hollow axis, means for moving said extensible boring cutter axially to project beyond the face of said face cutter, a runway positioned parallel to the plane of the sweep of said face cutter, a traveling work carriage mounted on said runway and adapted to be moved into alinement with said boring cutter, fastening means on said carriage for rigidly holding work, said carriage being adapted to move work to a position in alinement with said boring cutter, a stationary centering test member constituting a gage for fixing the lateral position of the work with respect to said cutters, said face cutter being adapted to cut a face of the work while said carriage is being moved into alinement with said boring cutter.

In testimony whereof I have hereunto set my hand.

SPENCER HEATH.

Copies of this patent may be obtained for five cents each, by addressing the "Commissioner of Patents, Washington, D. C."